United States Patent Office 2,982,125
Patented May 2, 1961

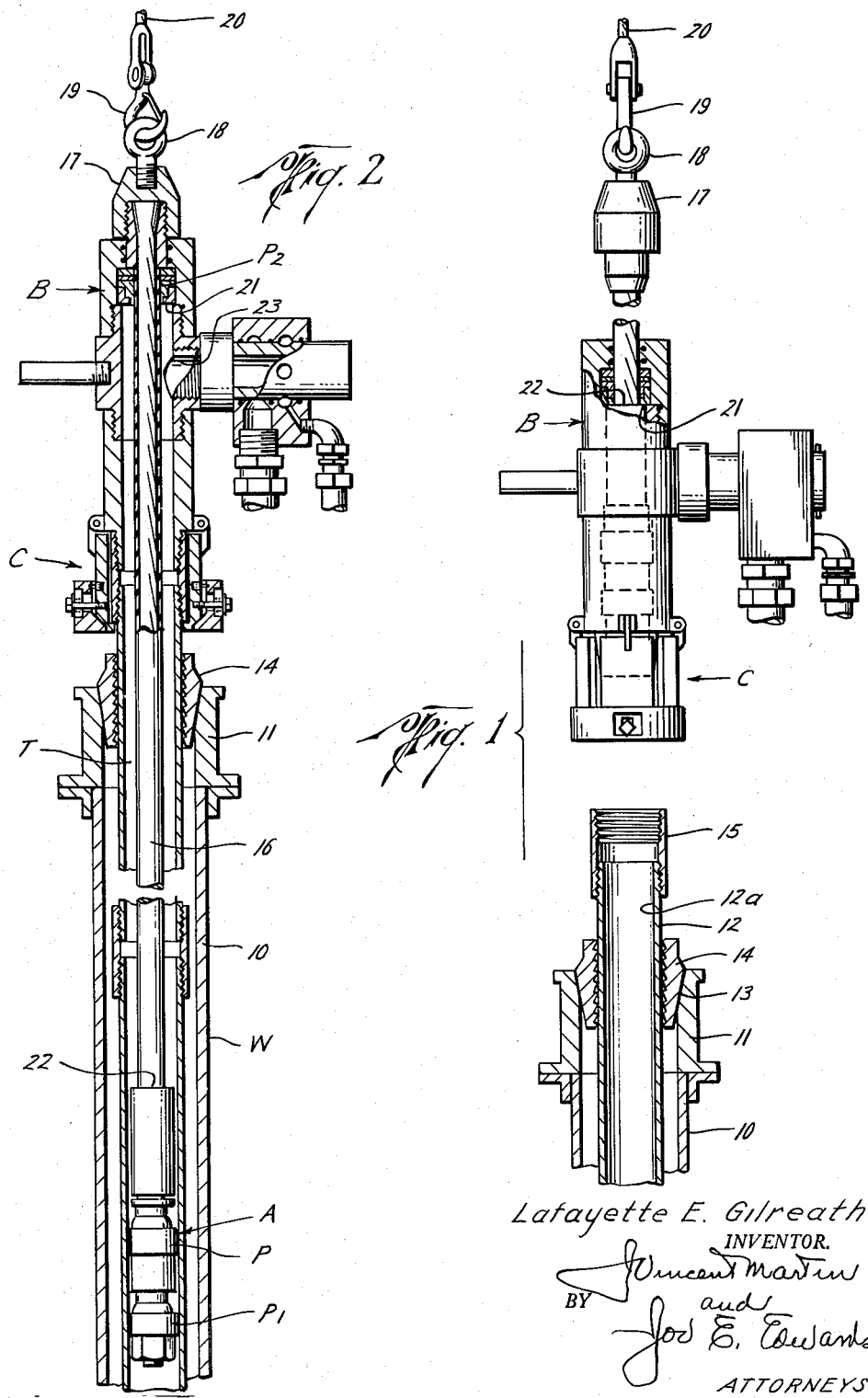
Lafayette E. Gilreath
INVENTOR.

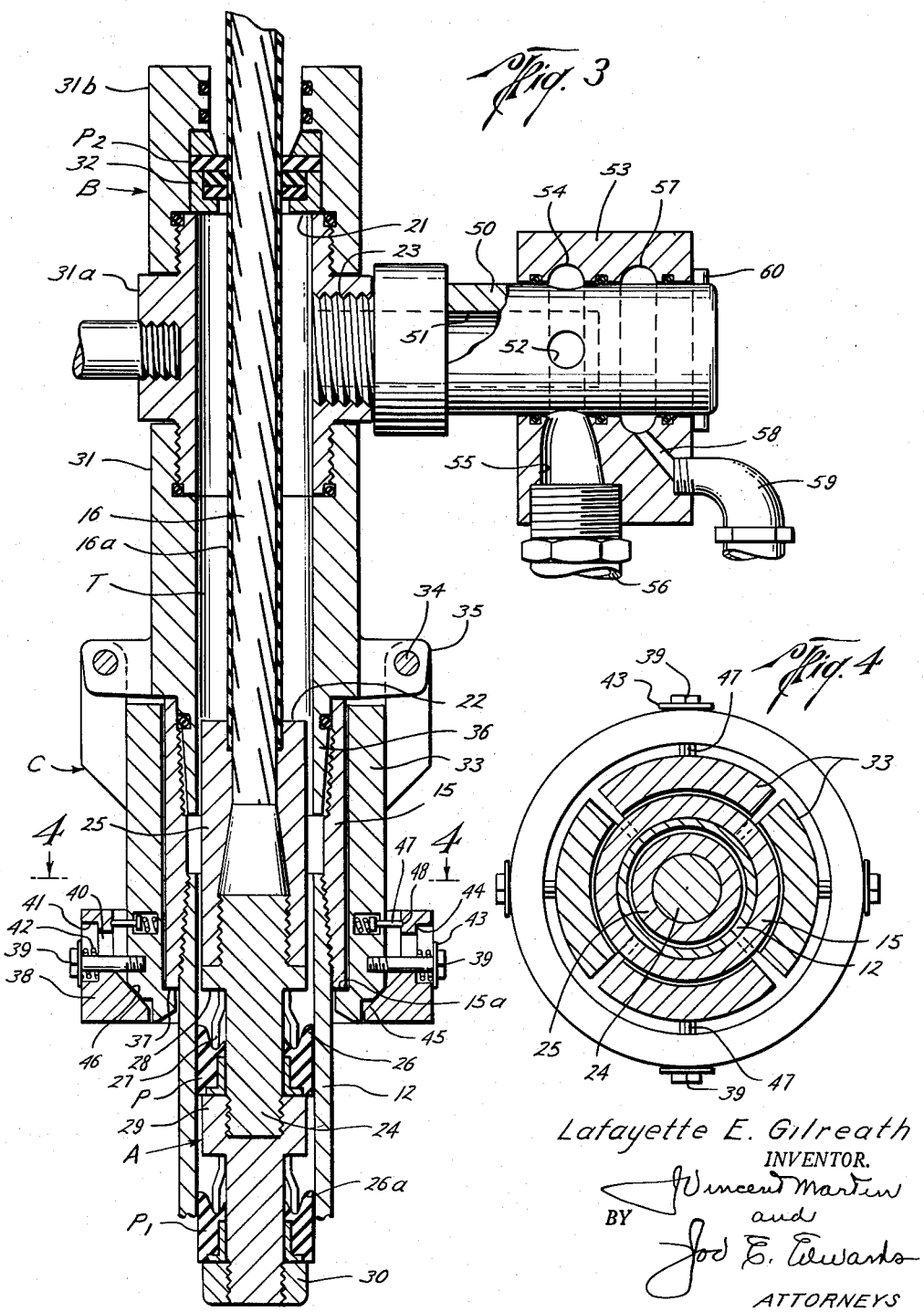

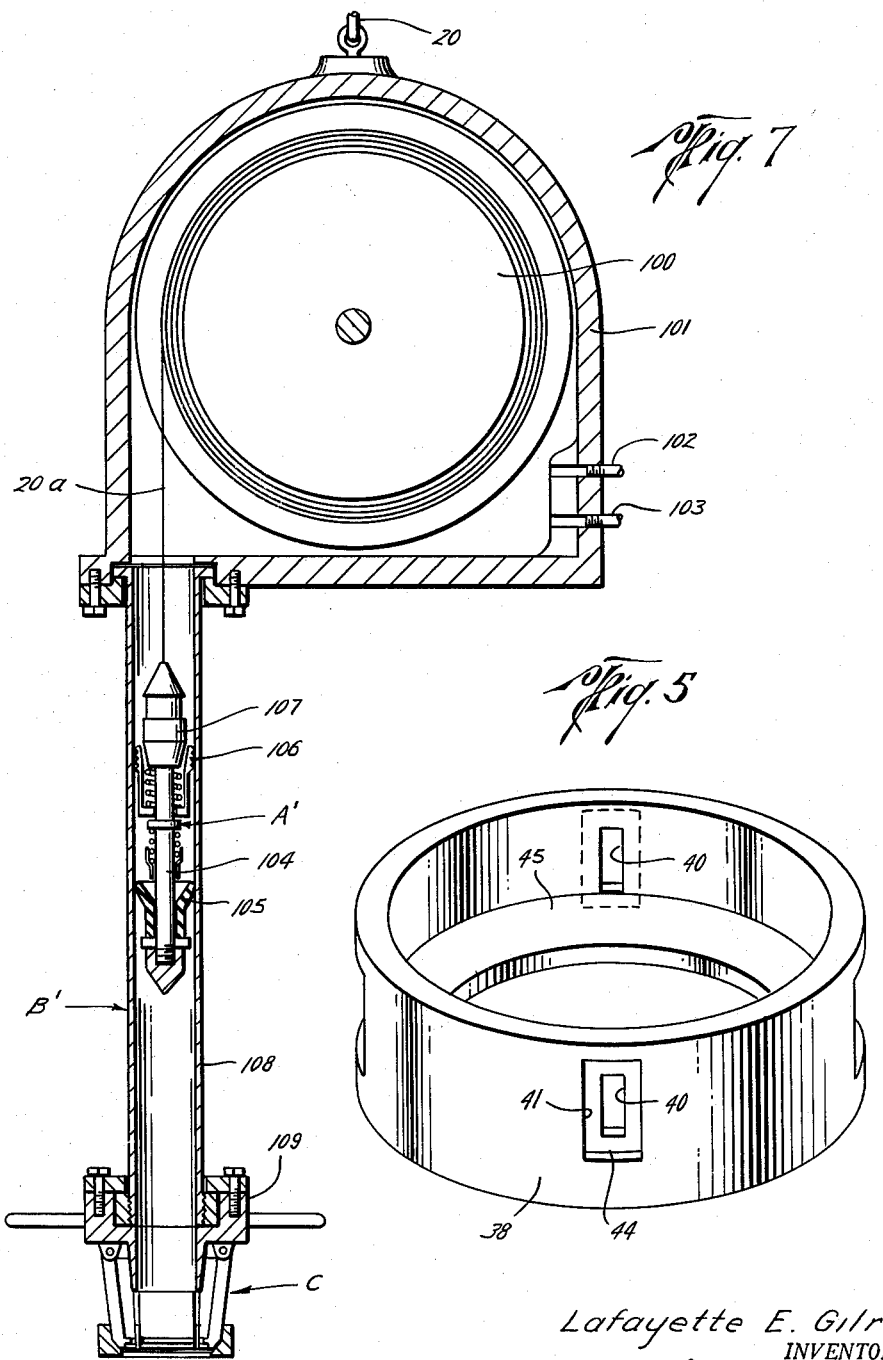

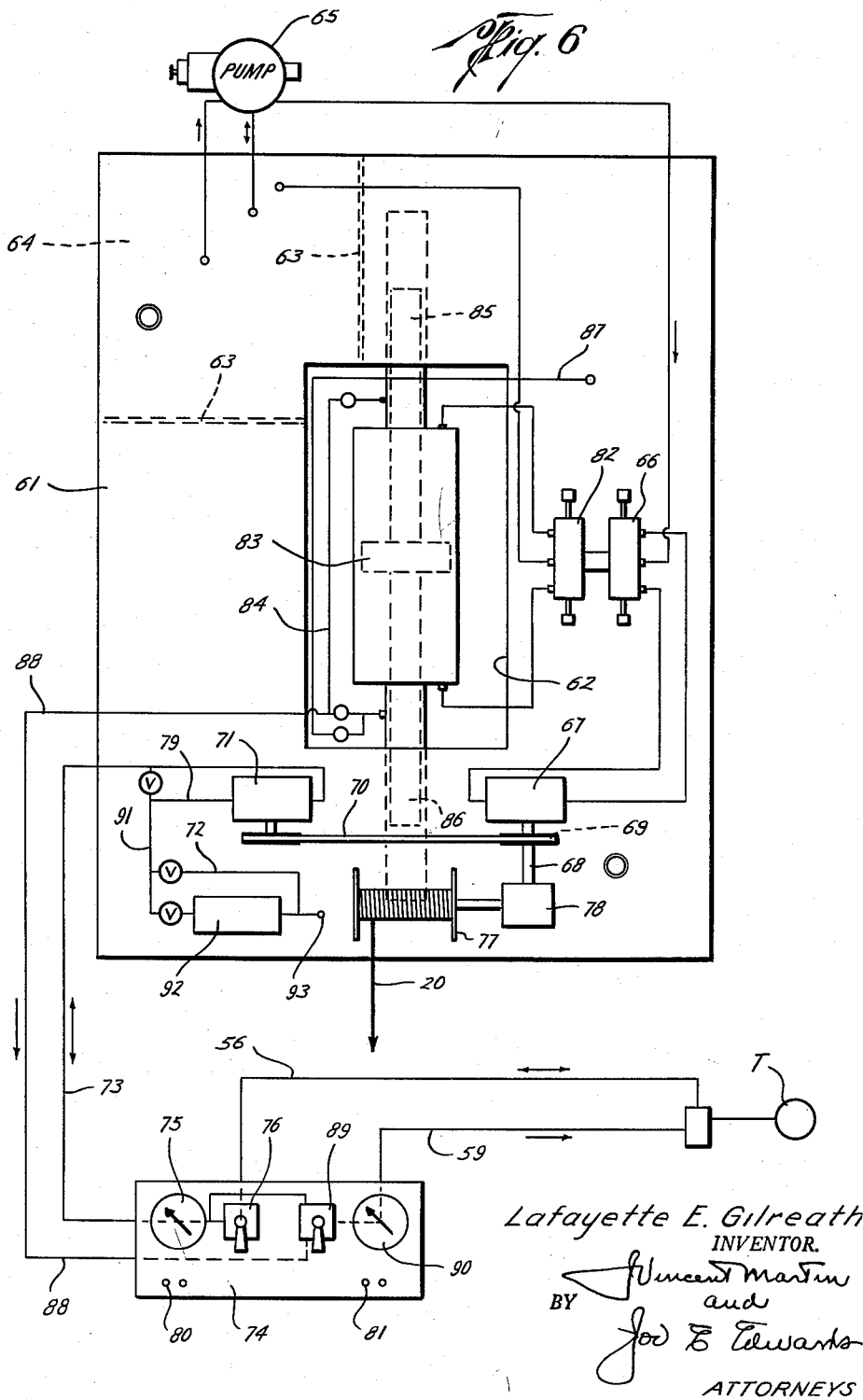

2,982,125

METHODS OF AND APPARATUS FOR TESTING WELL PIPE

Lafayette E. Gilreath, Houston, Tex., assignor, by mesne assignments, to Melco Manufacturing Company, Houston, Tex., a corporation of Texas Filed Aug. 13, 1956, Ser. No. 603,675

14 Claims. (Cl. 73—40.5)

This invention relates to new and useful improvements in methods of and apparatus for testing well pipe.

One object of the invention is to provide an improved method of testing well pipe, such as well tubing, as the same is being lowered into or removed from the well; the method being carried out in a minimum length of time and with substantially no loss of the testing fluid, whereby fast and economical testing of the pipe may be accomplished.

An important object is to provide an improved method of testing well pipe wherein a testing tool assembly is adapted to be lowered simultaneously with a testing head unit so that a single cable may be utilized to lower the testing tool assembly into position within the pipe and at the same time properly position the testing head unit for connection with the upper end of the pipe, after which the test may be carried out; said method also including the withdrawal of the testing tool assembly and raising of the testing head unit by means of the single cable after the test is complete whereby rapid testing may be carried out and also whereby the testing tool assembly is completely removed from the well pipe between each testing operation.

Another object is to provide an improved well pipe testing method wherein testing fluid under pressure is introduced into a test area within the pipe from a source of supply and is placed under pressure to effect a test of said pipe; said testing fluid being positively withdrawn from the test area after each testing operation and returned to said source, whereby substantially no loss of fluid is realized.

A further object of the invention is to provide an improved well testing apparatus having a testing tool assembly which co-acts with a testing head unit in such manner that the assembly and unit may be simultaneously lowered and raised; said head unit having a quick coupling arrangement which permits rapid coupling and uncoupling of the head unit to the upper end of the pipe, whereby the positioning of the assembly and unit as well as the removal thereof may be rapidly accomplished to permit the testing operation to be carried out in a minimum length of time.

Another object is to provide a well testing apparatus of the character described, having an improved testing head unit having a quick coupling connection and also having a simple slide valve for controlling the introduction of testing fluid into the test area either at a high volume (volumetric rates of flow) and under relatively low pressure which is necessary at the beginning of the test or at a low volume under high pressure such as is necessary to accomplish the efficient testing.

Still another object is to provide an apparatus of the character described, having a testing fluid supply tank which is adapted to be connected to the test area with a reversible pump for introducing the test fluid into the test area prior to the actual testing operation and for positively withdrawing the test fluid from said area and returning it to said supply tank after the test is complete.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a view partly in section and partly in elevation of a well testing apparatus, constructed in accordance with the invention and illustrating the testing tool assembly and the test head unit in a position spaced above the well pipe to be tested, Figure 2 is a similar view illustrating the testing tool assembly in position within the pipe with the test head unit attached to the upper end thereof, Figure 3 is an enlarged vertical sectional view of the test head unit in position on the pipe and for purposes of illustration showing the testing tool assembly as it is lowered into the pipe, Figure 4 is an enlarged horizontal cross-sectional view taken on the line 4—4 of Figure 3, Figure 5 is an isometric view of the locking ring of the quick coupling latch mechanism which couples the head unit to the upper end of the pipe, Figure 6 is a schematic view of the pump and control equipement used during the testing operations, and Figure 7 is a sectional view of a modified form of the invention.

In the drawings the numeral 10 designates a well casing which extends downwardly through a well bore W and which has a tubing head 11, which is schematically illustrated, secured to its upper end. The well tubing 12 is arranged to be lowered through the well casing into the well bore in the well known manner and the present invention provides a testing method and apparatus for pressure testing the tubing 12 as it is being lowered into the bore or as it is being removed therefrom. For supporting each section of tubing 12 in a position so that pressure testing thereof may be accomplished, the tubing head 11 is provided with the usual slip receiving bowl 13 which is adapted to receive the supporting slips 14, whereby the tubing is suspended from said slips. As is well known the tubing string consists of a plurality of stands which are coupled together by the usual coupling collars 15.

The improved testing apparatus includes a testing tool assembly A, which as will be explained, is arranged to be lowered downwardly within the bore of the tubing to be tested. The tool assembly A is carried by an elongate supporting element 16 which is illustrated as a flexible cable but which may if desired be an elongate rod, the upper end of the cable is secured within the usual cable socket and stop means 17 and said socket is provided with an eye 18 which receives a hook 19. The hook 19 is secured to the lower end of the line 20 which passes upwardly into the derrick (not shown) and which is employed to raise and lower the tool assembly A with respect to the tubing 12.

Surrounding the cable 16 and slidable with respect thereto within limits is a test head unit generally indicated at B. The head unit is provided with a latching mechanism C at its lower end and by means of the latching mechanism the head unit may be secured against upward movement with respect to the upper end of the tubing 12 which is being tested. The unit B is formed with an internal shoulder 21 at its upper end and this shoulder is adapted to be engaged by the upper end 22 of the tool assembly A in the manner shown in Figure 1. When the shoulder 21 is in engagement with the upper end of the tool assembly A, the head unit B is suspended from the tool assembly A and both the tool assembly A and the head unit are suspended from the line 20. Thus the tool assembly and the head unit may be moved upwardly in the derrick by means of the line 20 so as to be completely out of the way of the derrick floor to facilitate insertion of the next stand or stands of well tubing 12 into the well bore.

In carrying out the improved method the testing tool assembly A and the head unit B are suspended from the line 20 and are at some point in the upper portion of the well derrick. The well tubing section or stand which is to be tested is introduced into the well bore and is then supported by the slips 14 in the manner illustrated in Figure 1. Thereafter the line 20 is lowered so as to simultaneously lower the testing tool assembly A and the test head unit B. As the head unit B moves into engagement with the upper end of the coupling collar 15 at the upper end of the tubing 12, the latch mechanism C is actuated to latch the head unit to the tubing. Continued lowering of the line 20 will permit the testing tool assembly A to be lowered downwardly through the bore 12a of the well tubing 12, in the manner illustrated in Figure 2. The tool assembly A includes packing elements P and P1 which seal with the bore 12a. The head unit includes a packing P2 in its upper portion with seals around the element or cable 16 and thus a test area generally indicated at T in Figure 2 is provided within the interior of the tubing 12 between the packer P on the tool assembly A and the packing P2 on the head unit. Thereafter, as will be explained, fluid under pressure is introduced into this test area through and inlet 23 formed in the thead unit B and the section of tubing above the packer P is subjected to a pressure test.

After the pressure testing operation has been carried out, the test fluid within the test area is positively withdrawn therefrom through the inlet 23. At the same time the latch mechanism C is uncoupled and the line 20 is raised. Upward movement of the line results in a raising of the element or cable 16 to withdraw the testing tool assembly A from the section of tubing 12 which has just been tested. When the testing tool assembly A moves upwardly within the test head unit B and its upper end 22 engages the internal shoulder 21 within said unit, the continued raising of line 20 lifts both the tool assembly and the head unit upwardly above the tubing 12 to some point in the upper portion of the derrick (not shown). Thus the tool assembly and the head unit are completely out of the way and the next section of well tubing 12 may be connected to the coupling 15 and then lowered within the well bore until the coupling at the upper end of the added section is located as shown in Figure 1. Thereafter the testing operation is repeated in the manner described. It is pointed out that the method may be carried out while the tubing is being lowered into the well or if desired the sections of the tubing may be progressively tested as the tubing is being removed from the well bore.

The construction of the testing tool assembly A is clearly shown in Figure 3 and such tool comprises a central mandrel 24 which has a cable socket or connector 25 at its upper end. The connector 25 attaches the lower end of the element or cable 16 to the upper portion of the mandrel 24. The packing element P is mounted on the mandrel and is generally in the form of a packing ring having an upwardly directed lip 26; a suitable spacer 27 which is confined between an external shoulder 28 on the mandrel and the packing ring P maintains said ring in position upon an enlargement 29 formed on the mandrel. The second packing element P1 is also in the form of a sealing ring having an upwardly directed lip 26a and this ring is supported upon a nut 30 which is threaded on the lower end of the mandrel. As illustrated the mandrel 24 is made in two sections which are screwed together whereby assembly of the structure is facilitated.

When the testing tool assembly A is within the bore of the tubing 12 it will be evident that a downward pressure in the annular space between the cable 16 and the bore of the tubing will be directed against the sealing lip 26 of the upper packing ring P and will function to move the sealing lip into tight sealing engagement with the bore of the tubing. The second packing ring P1 is provided as a safety feature so that if any leakage occurs past the upper ring P, the lower ring will seal such leakage. It is pointed out that the tool assembly A could include only a single packing or sealing element.

The test head unit B comprises an annular body portion which is constructed of sections 31, 31a and 31b which are screwed together to form an elongate tubular housing or body. The section 31 has the latch mechanism C connected thereto, as will be explained, while the section 31a has the inlet 23 for the test fluid formed therein, this inlet being a radial port or opening in one side of said section. The upper section 31b contains the packing assembly P2 which assembly is supported by an angular ring 32, the lower portion of the ring forming the internal shoulder 21 which is engaged by the upper end 22 of the tool assembly, as has been explained. The packing P2 is confined in the upper section 31b and seals off around the element or cable 16 which cable is illustrated as having a sheath or covering 16a of rubber or other material.

The latching mechanism C includes a plurality of pivoted latch members or dogs 33, each dog having its upper end pivoted on a pin 34 which extends transversely of radially projecting ears 35 formed on the body section 31 of the unit B. The lower end of the section 31 has a cylindrical extension 36 which is adapted to enter the upper end of the coupling collar 15 on the upper end of the tubing 12 and when this extension is in place within the coupling, as shown in Figure 3, the latches or dogs 33 extend downwardly around the exterior of the coupling collar 15. Each latching dog is of such length that when the extension 36 is in place and the lower end of the section 31 of unit B is resting upon the upper end of the coupling 15, a shoulder 37 on each dog is adapted to be swung inwardly beneath the lower end 15a of said collar. Obviously when the shoulders 37 of the latching members 33 are engaged beneath the lower end of the coupling collar, the unit B is locked against displacement from the upper end of the tubing 12.

For moving the latching members 33 inwardly beneath the coupling collar into latched position or for moving said members outwardly so that the latching mechanism may be disconnected, an actuating collar 38 is provided. The collar 38 surrounds the lower portion of the latching members 33 and is connected with the latch members for limited longitudinal movement with respect thereto by bolts 39. As shown in Figure 3 the collar 38 is formed with a slot 40 which is opposite each latch member 33 and beyond said slot the collar has a recessed portion 41. Each bolt 39 projects through the slot 40 and a spring 42 confined between a washer 43 and the shoulder 44 formed by the recessed portion 41 constantly urges the latch member radially outwardly toward the collar 38. When the collar is in a raised position with respect to the latch members, as shown in Figure 3 a beveled surface 45 within the bore of the collar co-acts with an inclined surface 46 provided on each latch member and such co-action moves the latch members inwardly so that their shoulders 37 engage beneath the coupling 15. Spring pressed pawls 47 are adapted to engage an internal groove 48 provided in the upper portion of the bore of the collar 38, when said collar is in a raised position with respect to the latch members 33; these pawls function to frictionally lock the collar in its raised position with respect to the latches and will hold the latches in their radially inward position with their respective shoulders 37 engaged with the lower end of collar 15.

When it is desired to unlatch the mechanism C and disconnect the latch members 33 from the collar 15, it is only necessary to manually move the collar 38 downwardly with respect to the latch members. Such downward movement will cause the bolts 39 which are secured to the latch members to ride upwardly in the slots 40 and when this occurs the spring 42 behind each bolt 39 will cause a retraction or a radially outward movement of each latch member, whereby the shoulders 37 are moved clear of the lower end 15a of the coupling. It is noted that the downward movement of collar 38 with respect to the latch members 33 moves the beveled surface 45 of the collar away from the inclined surface 46 of the latch members and thereby allows said members to be moved outwardly.

Although the particular type of latch mechanism C has been found extremely satisfactory because it may be quickly and easily connected or disconnected, it is pointed out that other types of connections between the head unit B and the coupling 15 may be made. As a matter of fact it would be possible to thread the extension 36 on the body section 31 of the unit B and merely thread the unit into connected position at the upper end of the tubing 12; however, in such event more time would be involved in making and breaking the connection.

For introducing the test fluid into the test area T in a desired manner, a tubular nipple 50 had one end threaded into the inlet 23. This nipple is formed with a bore 51 which is open at its inner end but which is closed at its outer end. A radial port 52 communicates with the bore 51 so that pressure fluid may be introduced into the bore and then into the test area. For controlling the introduction of either the high volume low-pressure fluid or a low volume high-pressure fluid into the test area through the port 52 a slide valve collar 53 is slidable on the exterior of the tubular nipple 50. As shown in Figure 3 the valve collar 53 has an annular groove 54 in its bore and this annular groove communicates through a radial opening 55 with a relatively large diameter conductor 56. When the groove 54 is aligned with the port 52 a large volume of fluid may be introduced through the conductor 56 into the port and then into the test area. Thus after the head unit B is in position and the tool assembly A is being lowered into the bore of the tubing to be tested, the collar 53 is moved to the position shown in Figure 3 so that a large volume of test fluid under relatively low pressure may be introduced into the test area so as to quickly fill the test area with the testing fluid.

After the testing fluid has been introduced into the test area and the tool assembly A is in proper position, the slide valve collar 53 is moved longitudinally inwardly on the nipple 50 so as to align a second annular groove 57 with the inlet opening 52. The groove 57 has communication through a passage with a high pressure conductor 59 so that a high pressure fluid at a relatively low volume may be introduced into the test area T. Thus a suitably high pressure to accomplish pressure testing of the pipe may be applied into the test area. Displacement of the slide collar 53 outwardly from the nipple 50 is limited by a transverse stop-pin 60. It is evident that the provision of the slide collar 53 provides a rapid and easy means for quickly shifting from high volume low-pressure fluid to high pressure low-volume fluid.

After a test is complete, the slide valve collar 53 is returned to the position shown in Figure 3 so as to establish communication between the test area and the relatively large conductor 56. By means of a suction pump, as will be explained, the test fluid is quickly withdrawn from the test area and such withdrawal may be assisted by the upward movement of the tool assembly A which may be accomplished by lifting on the line 20 in the manner hereinbefore described.

Any suitable source of testing fluid supply and any suitable equipment for applying the proper pressure to the test fluid may be employed but in Figure 6 is shown a schematic layout of the testing fluid source of supply and the various controls therefor which have been found satisfactory for the present operation. Referring to Figure 6 a tank 61 is illustrated with said tank being generally rectangular in shape but having a central opening 62 therein. Partitions 63 form a chamber 64 at one end of the tank and this chamber receives oil or other hydraulic fluid for actuating a hydraulic motor; the remaining portion of the interior of the tank forms a supply source for the test fluid which is usually water. A hydraulic pump 65 is adapted to pump hydraulic fluid through a four-way control valve 66 to a hydraulic motor 67. When the valve 66 is in one position the motor 67 drives its shaft 68 in one direction and when the position of the control valve 66 is changed the direction of rotation of shaft 68 is reversed. The shaft 68 has a driving pulley 69 which is connected through a drive-belt 70 with a pump 71. The suction side of the pump, when test fluid is to be introduced into the test area T is connected through line 72 with the interior of the tank 61 so that water or other test fluid will be withdrawn from the tank and directed through an outlet line 73 to a control panel 74 disposed at some remote location from the tank. When the pump 71 is operating to direct fluid to the test area T, the fluid is pumped through line 73, passes through a pressure gauge 75, through a manual control valve 76, and finally through the conductor 56 which connects with the slide valve sleeve 53 (Figure 3).

At the same time that the hydraulic motor 67 is operating the pump 71 to pump a relatively large volume of test fluid through conductor 56 into the test area, said motor is operating the winch 77 on which the line 20 is wound, such operation being through a gear-box 78. In operation, the hydraulic motor 67 is started to reel out the line 20 and thereby lower the tool assembly A and head B and at this time the manual valve 76 is closed so that the pump 71 is merely bypassing its output through bypass line 79. As soon as the test head unit B is latched to the coupling 15 at the upper end of the tubing, the valve 76 is opened so that as the tool assembly A is moving downwardly into final position a relatively high volume of test fluid is being introduced into the test area above the packer P on the tool assembly A. This introduction of fluid exerts a downward force upon the packing P to force the tool downwardly into final position.

When the tool assembly A reaches its final position within the tubing the control valve 66 is actuated to stop the operation of the hydraulic motor 67 and this may be accomplished from control buttons 80 on the control panel 74. At the same time control buttons 81 actuate a second control valve 82 to direct hydraulic fluid to the main piston 83 of a hydraulic ram 84. The ram 84 is adapted to be double acting being provided with reduced size pressure pistons 85 and 86 at each end thereof. Pressure fluid from the tank 61 is drawn into the hydraulic ram through line 87 and is directed through line 88 to the test area T. Line 88 connects with a manual control valve 89 on the control panel and beyond this valve, the conductor 59 extends to the test area. A suitable pressure gauge 90 may be provided on the panel.

When the ram 84 is being actuated the desired pressure is applied to the pressure fluid within the test area T to perform a pressure testing operation of the particular tubing section under test. Of course it will be understood that the low pressure control valve 76 is closed at the time that the high pressure control valve 89 is open. After a pre-determined pressure has been maintained in the test area for a given length of time and the gauge 90 indicates that there is no loss of this pressure, the testing operation is complete.

Thereafter the control valves 66 and 82 are moved to a position which shuts off further flow of hydraulic power fluid to the ram 84 and directs this power fluid to the hydraulic motor 67 in a direction which will reverse the rotation of the shaft 68. The high pressure valve 89 is closed while the low pressure valve 76, both of these valves being on the control panel 74, is open. Due to the reversal in the direction of rotation of the hydraulic motor shaft 68 the pump 71 is operated to apply suction to the conductor 56 to positively withdraw the test fluid from the test area T. This relieves the total of the fluid load thereabove during removal of said tool. This fluid returns through line 73 and then through a return line 91, a strainer 92 and is returned to the tank at point 93 in Figure 6.

At the same time that the pressure fluid is being withdrawn from the test area the hydraulic motor 67 is operating the gear-box 78 to rotate the winch or drum in a direction to wind the line 20 upon said drum whereby the tool assembly A is raised upwardly into the test head unit B. By the time that the tool assembly A moves upwardly into the test head unit B as shown in Figure 1 so that its upper end 22 strikes the internal shoulder 21 within said unit, the test fluid has been withdrawn from the test area T; as a matter of fact the upward movement of the assembly A will assist in lifting the pressure fluid from the tubing. At this point the latch mechanism C is actuated by moving the actuating collar 38 of the latch mechanism downwardly with respect to the latches and the control head unit is thus disengaged from the upper end of the tubing. Thereafter the unit is lifted upwardly away from the tubing so that the next section of tubing may be properly disposed in position whereby the test may be repeated.

It is believed that the operation of the apparatus and the practice of the method is obvious. The testing tool assembly A and the test head unit B is suspended from the line 20 until the tubing section 12 which is to be tested is to be properly positioned. Line 20 is then lowered to move the control head unit into contact with the upper end of the tubing and the latch mechanism C is actuated to couple the same in place. At this point the slide valve 53 on the inlet nipple 50 is moved to the position shown in Figure 3 whereby the line 56 is in communication with the inlet port 52 and as the line 20 continues its lowering to move the tool assembly A downwardly to its final position, the pump 71 operates to introduce a relatively high volume low-pressure fluid into the test area T. This applies a downward force to the tool and makes possible the introduction of the tool against heavy weight mud and gas pressure whereby testing of tubing in certain type wells which cannot be tested with gravity falling test tools may be efficiently accomplished.

When the tool reaches its final position the slide valve 53 is actuated so that the high pressure line 59 is in communication with the inlet port 52. At this point the pump 71 and the winch 77 are halted and hydraulic power fluid is directed to the ram 84 whereby the desired high pressure may be applied to the test area to subject the section of tubing 12 to a pressure test.

When the test is completed, the control valves 66 and 82 are actuated and the slide valve collar 53 is moved back to the position shown in Figure 3. The pump 71 operates in a reverse direction to withdraw the test fluid from the test area T and at the same time the winch is operated to lift or raise the line 20 whereby the tool assembly is withdrawn from the tubing and moved upwardly into the test head unit B. The latch mechanism C is uncoupled after which continuous operation of the winch 77 raises both the tool assembly and the control head unit to a position in the upper portion of the derrick completely out of the way, whereby the next section of tubing may be properly positioned. It is evident that the operation is repeated section by section and any desired number of stands of tubing may be tested at one time. The number of stands of tubing which will be tested is of course controlled by the length of the element or cable 16 because it is this length which controls the position to which the packer P on the tool assembly A will move within the bore of the tubing. As has been noted the tubing may be tested either as it is being run into the hole or as it is being removed from the well bore.

In Figure 7 a modified form of the apparatus is illustrated in which the entrance of outside air into the test area is prevented. In this modification a testing tool assembly A' is suspended from a line or cable 20a which is wound upon a reel 100 which is operable within a closed chamber 101. Suitable conductors 102 and 103 are connected to the housing or closed chamber 101 for conducting the test fluid to and from said chamber.

The testing tool assembly A' includes a central mandrel 104 having a sealing cup 105 on its lower end. A gripping slip unit 106 is mounted on the mandrel and said mandrel has an expander cone 107 thereon which is adapted to co-act with the slips 106 to set the same when a downward pressure is applied to the packing cup 105.

The test head unit B' includes an elongated tubular pipe section 108 within which the tool assembly A' is adapted to be located prior to a testing operation. The lower end of this pipe section has a suitable body portion 109 from which the latching mechanism C is suspended.

In the operation of this form of the invention the entire assembly including the reel would be suspended from the line 20 and both the test head unit B' and the tool assembly A' would be lowered together until the test head unit engages the upper end of the tubing and is coupled thereto by the latch mechanism C. Thereafter the reel 100 is actuated to lower the tool assembly A' downwardly into the bore of the tubing to be tested. During the lowering of the tool assembly A' into final position pressure testing fluid would be introduced through the conductor 102 so that it would follow the tool assembly A' and thereby fill the area thereabove. Here again the introduction of pressure fluid forces the tool downwardly into position. When the tool assembly A' reaches its final position the desired testing pressure is built up thereabove to subject the tubing to the pressure test.

After the test is complete the reel 100 is actuated in a reverse direction to lift the testing tool assembly A' upwardly into the pipe section 108 of the unit B'. As it is lifted a suction may be applied to the chamber 101 to withdraw the test fluid and withdrawal of said fluid will of course be assisted by the upward movement of the packing element 105 on the tool assembly A'. After the tool is in position within the pipe section 108, the latching mechanism is uncoupled from the upper end of the tubing and the line 20 is raised to raise both the unit B' having the tool assembly A' therein upwardly out of the way so that the next section of tubing which is to be tested may be properly placed. In this form of the invention the pressure fluid is always within the chamber 101 and above the sealing element 105 of the testing tool and obviously no outside air can enter the test area at any time. Of course the same supply tank and control equipment as shown in Figure 6 may be adapted to the form shown in Figure 7.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. The method of testing well pipe which includes supporting a pipe within a well bore with its open upper end adjacent the surface of the well, simultaneously lowering a testing tool assembly and a test head unit toward the pipe and introducing the tool assembly into the bore while moving the head unit into contact with the upper end of the pipe, connecting said test head unit to the open upper end of said pipe to close the same, thereafter lowering the testing tool assembly downwardly within the pipe bore to define a test area within the pipe between the assembly and the head unit, simultaneously introducing test fluid at a high volume and low pressure into the test area while the testing tool assembly is moving downwardly to its final position, thereafter introducing additional test fluid at a relatively lower volume but under pressure sufficiently high to pressure test the pipe in the test area, withdrawing the test fluid from the test area, disconnecting the test head unit, and then simultaneously raising the testing tool assembly and the head unit upwardly away from the pipe.

2. The method of testing well pipe which includes supporting a pipe section within a well bore with its open upper end adjacent the surface of the well, simultaneously lowering a testing tool assembly and a test head unit toward the pipe section and introducing the tool assembly into the bore while moving the head unit into contact with the upper end of the pipe section, connecting said test head unit to the open upper end of said pipe section to close the same, thereafter lowering the testing tool assembly downwardly within the pipe section bore to define a test area within the pipe section between the assembly and the head unit, simultaneously introducing test fluid at a high volume and low pressure into the test area while the testing tool assembly is moving downwardly to its final position, thereafter introducing additional test fluid at a relatively lower volume but under pressure sufficiently high to pressure test the pipe section in the test area, withdrawing the test fluid from the test area, disconnecing the test head unit, disposing a second section of pipe within the bore of the well with its upper end adjacent the surface, and repeating the testing operation to pressure test said second section.

3. The method as set forth in claim 2, wherein the first section of pipe is lowered into position in the bore, and the testing operation is carried out, after which the second section is connected to the upper end of the first section and both sections are lowered to locate the second section in position to be tested, whereby the testing operations are effected while the pipe is being lowered into the bore.

4. The method as set forth in claim 2, wherein the first section of pipe has its lower end connected to the upper end of the second section and also wherein said first section is raised and removed from the well bore after the testing thereof has completed, said second section being moved upwardly into testing position whereby the well pipe is tested as it is being removed from the well bore.

5. A well pipe testing apparatus including, a testing tool assembly having a seal thereon for sealing against pressure in a downward direction, a support extending upwardly from the assembly and adapted to be raised and lowered to raise and lower the assembly with respect to the bore of a well pipe which is to be tested, and an annular test head unit slidably surrounding the support, said unit having means engageable with the tool assembly whereby said unit may be supported upon said tool assembly when the latter is supported in a position above the well pipe.

6. A well pipe testing apparatus including, a testing tool assembly having a seal thereon for sealing against pressure in a downward direction, a support extending upwardly from the assembly and adapted to be raised and lowered to raise and lower the assembly with respect to the bore of a well pipe which is to be tested, an annular test head unit surrounding the support, said closure unit being slidable relative to the support so that lowering of the support and tool assembly to a position which locates the assembly within the pipe engages the test head unit with the upper end of the pipe and halts its further movement with respect to the support and assembly, and means on said test head unit for connecting it to said pipe to thereby form a test area between said test head and the seal on said assembly.

7. A well pipe testing apparatus as set forth in claim 6, together with a testing fluid inlet in said test head unit for introducing test fluid into the test area, a slide valve including a high volume-low pressure port and a low volume-high pressure port, said slide valve co-acting with said inlet for selectively establishing communication between one or the other of said ports and said inlet.

8. A well pipe testing apparatus as set forth in claim 6, wherein the connecting means on the test head comprises pivoted latching dogs and an annular locking collar surrounding said dogs and slidable longitudinally of the dogs, said collar and dogs having co-acting surfaces which move the latching dogs radially inwardly when the collar is in one position relative thereto and which move the dogs radially outwardly when the collar is moved to a different position relative thereto.

9. In a well testing apparatus, a testing tool assembly including an elongate support, a sealing member secured to the lower end of the support, and a pipe test head unit slidable on said support and having sealing engagement therewith, said test head unit comprising an annular body adapted to be connected to the upper end of a well pipe to be tested, a radial extension projecting from the body, said extension having an axial bore provided with an inlet port, a slide collar on the extension having a first annular groove adapted to be aligned with the port when the collar is in one position on the extension, a low pressure fluid inlet communicating with said first groove, a second annular groove within the collar adapted to be aligned with the port when the collar is moved to a different position on the extension, and a high pressure fluid inlet communicating with said second groove.

10. In a well pipe testing apparatus, a testing tool assembly including an elongate support, a sealing member secured to the lower end of the support, and a pipe test head unit slidable on said support and having sealing engagement therewith, said test head unit including an annular body adapted to be engaged with the usual well pipe coupling, a plurality of pivoted latching members depending from the body and having their lower ends arranged to engage beneath the coupling when the members are moved radially inwardly, and a locking collar encircling the members and movable longitudinally of the members to a position which urges and maintains the members in their inward radial position, said collar being movable to another position which causes the members to be moved radially outwardly to disengage the coupling of the pipe.

11. The method of testing well pipe which includes positioning in a pipe a testing tool having two seals positioned close together with at least one of the seals slidable on a support, introducing testing liquid at a high volume and low pressure into the area between the seals to move the seals apart without trapping air therebetween, limiting movement of the seals away from each other to define a test area, and thereafter introducing additional test liquid at a relatively low volume but under pressure sufficiently high to pressure test the pipe.

12. The method of testing well pipe which includes positioning in a pipe a testing tool having two seals positioned close together with at least one of the seals slidable on a support, introducing testing liquid at a high velocity and low pressure into the area between the seals to move the seals apart without trapping air therebetween, limiting movement of the seals away from each other to define a test area, thereafter introducing additional test liquid at a relatively low volume but under pressure sufficiently high to pressure test the pipe, moving the two seals toward each other while withdrawing the test liquid, and then removing the entire testing tool from the pipe.

13. A well pipe testing apparatus comprising, a support, a testing tool assembly fixed on the support, a test head unit for sealing one end of a pipe to be tested, said test head unit slideable on said support, port means in said test head unit providing for introduction and removal of test fluid therethrough, and stop means on said support and test head unit limiting movement of the testing tool assembly away from the test head unit to define a testing area.

14. The apparatus of claim 13 wherein the test head unit has a bore for receiving the testing tool assembly whereby the test head unit can be secured to a pipe to be tested with the testing tool assembly in said bore and thereafter the testing tool assembly may be moved to testing position.

References Cited in the file of this patent

UNITED STATES PATENTS

| | | |
|---|---|---|
| 1,812,943 | Granger | July 7, 1931 |
| 2,071,204 | Hunt | Feb. 16, 1937 |
| 2,164,195 | Waltermire | June 27, 1939 |
| 2,478,628 | Hansen | Aug. 9, 1949 |
| 2,509,671 | Christensen | May 30, 1950 |
| 2,610,691 | Berry | Sept. 16, 1952 |
| 2,633,739 | Potts et al. | Apr. 7, 1953 |
| 2,652,717 | Bush et al. | Sept. 22, 1953 |
| 2,684,691 | Strickler | July 27, 1954 |
| 2,731,827 | Loomis | Jan. 24, 1956 |
| 2,793,524 | Badger | May 28, 1957 |